Oct. 31, 1939.  J. B. TEGARTY  2,178,410
THERMOPLASTIC MOLDING
Filed Nov. 5, 1938   2 Sheets-Sheet 1
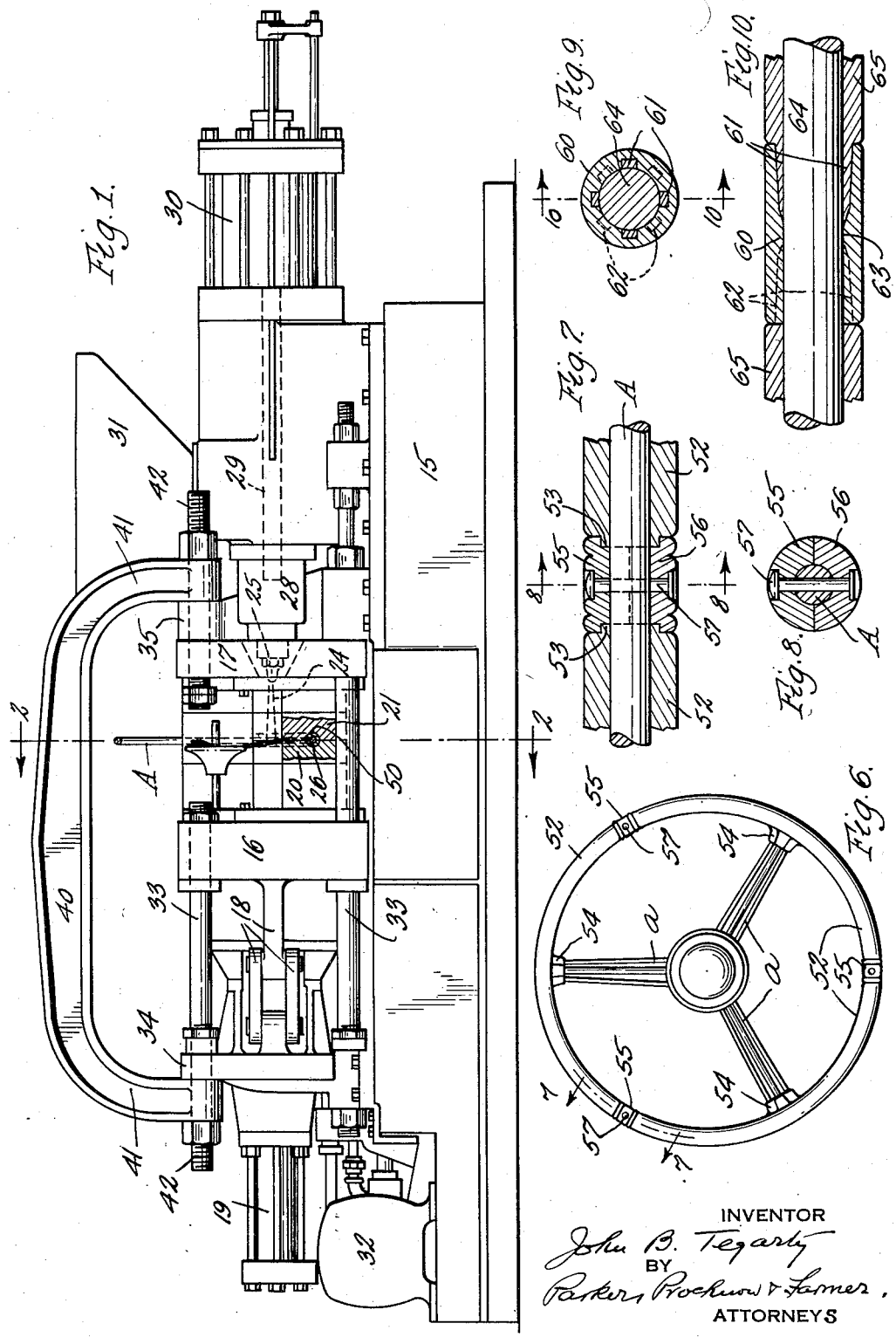
INVENTOR
John B. Tegarty
BY
Parker, Prockwin & Farmer,
ATTORNEYS Oct. 31, 1939.    J. B. TEGARTY    2,178,410
THERMOPLASTIC MOLDING
Filed Nov. 5, 1938    2 Sheets-Sheet 2
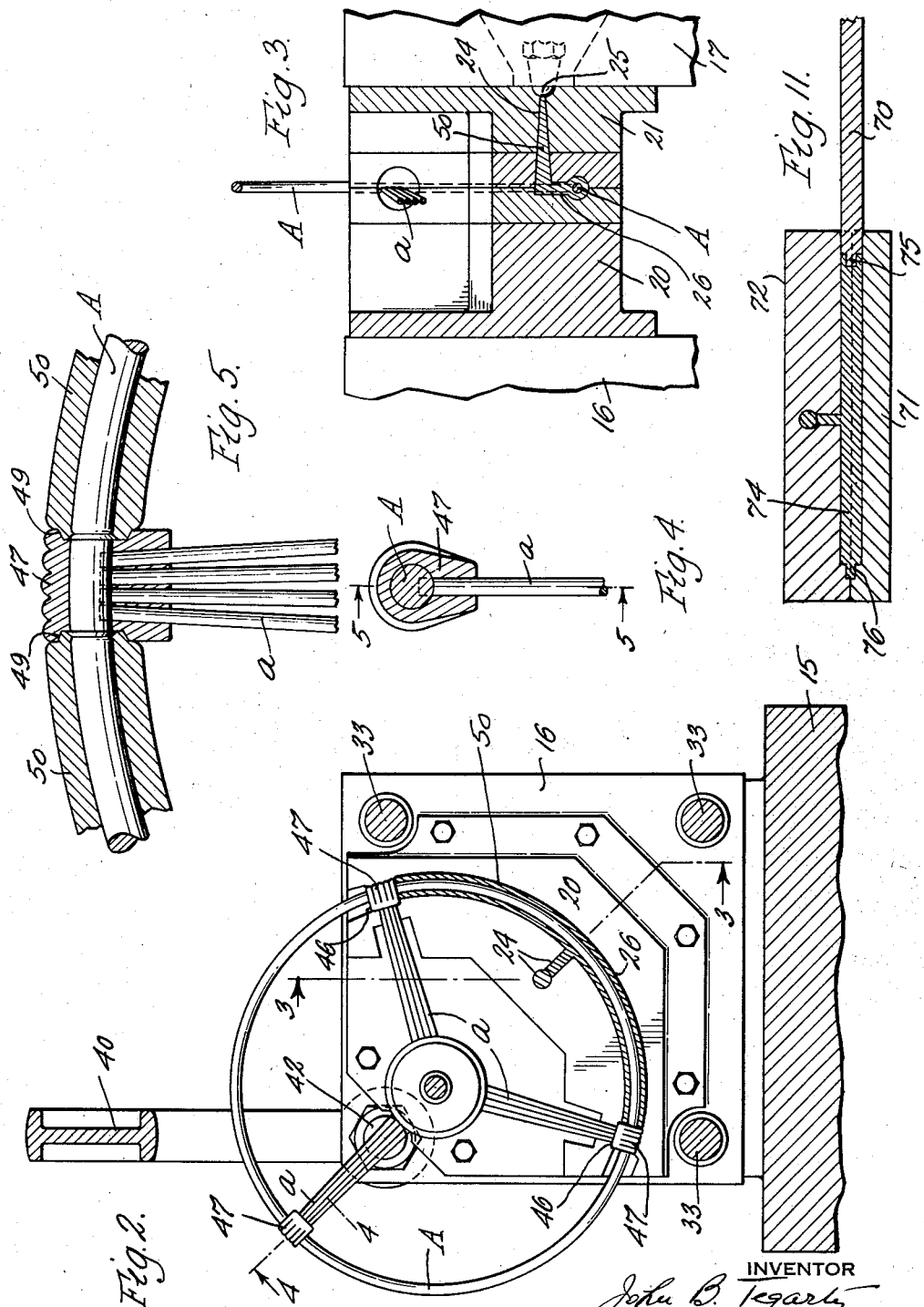
INVENTOR
John B. Tegarty
BY
Parker, Prochnow & Farmer.
ATTORNEYS Patented Oct. 31, 1939

2,178,410

UNITED STATES PATENT OFFICE 2,178,410

THERMOPLASTIC MOLDING

John B. Tegarty, Buffalo, N. Y., assignor to Sterling Injection Molding, Inc., Buffalo, N. Y.

Application November 5, 1938, Serial No. 239,137

17 Claims. (Cl. 18—59)

This invention relates to improvements in injection or extrusion molding, in which a thermoplastic material, such for example as cellulose acetate, is plasticized by heat and forced under high pressure into a mold cavity in which it is cooled and solidified. The invention does not relate to metal casting, where the problems and conditions are different than in injection molding of thermoplastic materials.

Machines now available for use in connection with this type of molding are limited in capacity because of the characteristics of thermoplastic materials and because of conditions under which the molding must take place, so that only a relatively small quantity of thermoplastic material can be extruded and molded at one time.

One of the objects of this invention is to provide an improved process whereby articles requiring thermoplastic material in excess of the capacity of the machine may be molded sectionally or step by step. Another object of this invention is to provide an improved process and apparatus for progressively sectionally molding thermoplastic material to form an article having an amount of thermoplastic material in excess of the capacity of the machine employed.

Another object of this invention is to provide an improved process of progressively sectionally molding a thermoplastic material whereby a relatively small machine may be employed to produce an article and whereby the article can, consequently, be produced at a lower cost. A further object of the invention is to provide a method and apparatus of this kind by means of which a relatively small mold can be employed which can, consequently, be cooled more rapidly so as to reduce the time required for completing a molding operation. A further object is to apply my improved process to preformed articles.

It is also an object of this invention to provide an improved process and apparatus for producing wheels and other articles having a thermoplastic material applied sectionally and progressively to different portions of the wheel.

Another object of this invention is to provide a molding machine of improved construction for use in connection with the molding of relatively large objects which would otherwise not fit into the machine. A further object of the invention is to provide articles of improved construction which can be formed by progressively sectionally molding thermoplastic material. A further object is to provide articles of improved construction including a preformed article for use in connection with this process and machine and having enlargements arranged at intervals therein which may cooperate with a cavity in a mold to close the ends thereof and with the molded sections to secure these sections in the desired relations to the article.

Other objects of this invention will appear from the following description and claims.

In the accompanying drawings:

Fig. 1 is a side elevation of a molding machine of improved construction for use in connection with a process embodying this invention and showing an article embodying this invention being operated upon.

Fig. 2 is a fragmentary transverse sectional elevation thereof, on line 2—2, Fig. 1.

Fig. 3 is a fragmentary longitudinal section thereof, on line 3—3, Fig. 2.

Fig. 4 is a fragmentary transverse section, on an enlarged scale, of an article formed in accordance with my improved process, the section being taken on line 4—4, Fig. 2.

Fig. 5 is a section thereof, on line 5—5, Fig. 4.

Fig. 6 is a face view of another article embodying this invention and formed in accordance with my process.

Fig. 7 is a section thereof on an enlarged scale, on line 7—7, Fig. 6.

Fig. 8 is a transverse section thereof, on line 8—8, Fig. 7.

Figs. 9 and 10 are respectively transverse and longitudinal sections of a joint or connection between adjacent molded portions of another article formed in accordance with my invention.

Fig. 11 is a longitudinal section of an article of another modified form, showing the same in a mold.

Figs. 1, 2 and 3 show a molding machine for use in connection with extrusion or injection molding. The greater portion of this machine is of a standard construction as heretofore used, the machine being changed in accordance with this invention to enable the same to produce some types of articles of relatively large dimensions in accordance with my improved process. The machine shown in the accompanying drawings includes a base 15 provided with a pair of die supporting plates 16 and 17 suitably mounted on the machine, at least one of said plates being movable toward and from the other. The die plate 16 in the construction shown is connected by means of a plurality of toggle links 18 arranged to be actuated by means of a plunger or piston arranged in a cylinder 19. When fluid under pressure is admitted into one end of the cylinder 19, the toggle links are moved toward and into dead center position for moving the die plate 16 toward the other die plate 17. 20 and 21 represent cooperating dies or molds of any desired kind suitably secured to the die plates 16 and 17, and 24 represents a passage formed in the die or mold 21 through which heat softened or plasticized thermoplastic material may pass from a nozzle 25 to a cavity 26 formed in the adjacent faces of the molds or dies. The nozzle 25 receives thermoplastic material from a heating cylinder 28, the thermoplastic material being extruded by means of a plunger 29, shown in broken lines in Fig. 1, which is actuated by means of a piston (not shown) arranged in a cylinder 30. 31 represents a hopper for thermoplastic material, from which the material may be fed in necessary quantities into the heated cylinder 28, when plunger 29 is reciprocated. 32 represents a motor which operates suitable compressing means for supplying fluid under pressure to the cylinders 19 and 30, and 33 represents a plurality of tie rods or bars which connect a stationary frame member or plate 34 to which one end of each set of toggle links 18 is pivoted, with another fixed part 35 of the machine located adjacent to the die plate 17. These tie rods serve to hold fixed parts of the machine in correct relation to each other and prevent separation of the dies or molds due to the heavy pressure of the thermoplastic material in the mold cavity. The machine as thus far described is of standard and well known construction, and this machine as heretofore constructed, may be used in connection with the manufacture of certain articles according to my invention.

In order to enable this machine to operate upon objects of a looped or annular form, such for example as steering wheels, which are of greater diameter than the space between the tie rods 33, I have provided means whereby one or more of the straight tie rods may be replaced by other means for opposing the stresses resulting from the pressing of the dies or molds into contact. These means may be of any suitable form, for example, a tie member 40 of arched form may be employed, the end portions 41 of which extend transversely to the body portion and are arranged to be secured to the stationary machine parts 34 and 35 by means of short bolts 42. These arched tie members provide for a greatly enlarged space transversely of the machine in which wheels, frames or looped articles may be arranged, which extend beyond the dies or molds of the machine, for reasons hereinafter more fully explained. Consequently, as clearly shown in Fig. 2, this construction readily permits a comparatively large article, such as a steering wheel, to be positioned so that a part thereof may be operated upon by a relatively small machine. Obviously other means for supporting or bracing the machine against the pressure exerted against the die plates may be employed.

It will be noted in referring to Figs. 1 to 3 that the die used in connection with my improved process is of such form as to cooperate at one time with a portion only of the article, and the article may be turned or advanced into another position in which another portion of the article is to be molded. The die is also provided at the ends of the cavity 26 therein with suitable portions 46 which are formed to engage portions of the article to securely clamp the same in correct relation to the cavity in the mold. In case of a wheel, these parts of the mold may be formed so as to engage the preformed rim A of the steering wheel, or if desired, the clamping parts of the mold may engage with enlargements or anchoring portions on the preformed rim or core of the steering wheel for securing the steering wheel in correct relation to the mold, and preferably these enlargements also close the ends of the mold cavity. If desired, the ends of these enlarged portions may be recessed or otherwise formed as to provide parts into which thermoplastic material may flow or embed itself for providing secure anchorages for the ends of the sections of the thermoplastic material. In the construction shown in Figs. 1 to 5 inclusive, the preformed wheel rim A is provided with enlarged portions 47 arranged at the spokes a of the wheel. These enlarged portions may be formed of metal, in which case they may, for example, be die cast on these portions of the wheel, or if desired, the enlarged portions may be made of thermoplastic material applied by means of the machine described in molds or dies having a corresponding cavity, to portions of the rim of the wheel at the outer ends of the spokes. In the construction shown, the enlarged portions 47 also form separating elements for the final thermoplastic sections and are provided with undercut or recessed end faces 49, but if desired, outwardly extending parts may be provided for anchorages for the final thermoplastic material applied to the wheel rim.

In the use of my process, the dies or molds are formed in such a manner that the mold cavity 26 is shaped to form the desired article, which in the case illustrated in Figs. 1 to 5 is a thermoplastic covering about that portion of the rim core A which extends into the mold cavity. At the ends of the mold cavity 26, the dies are so formed at the gripping portions 45 as to receive the enlargements 47 and securely grip them. This enables the dies to hold the part of the rim core A in correct position with reference to the die cavity 26 and the enlargements, consequently, also form closures for the ends of the mold cavity.

After the two dies have been brought into engagement by means of the toggle links 18 and cylinder 19, plasticized or semi-liquid thermoplastic material is forced into the die cavity through the passage 24 in the mold until the cavity of the mold is completely filled and the thermoplastic material 50 enters into engagement with the end portions 49 of the enlargements or separating elements 47. The thermoplastic material is maintained under high pressure in the mold cavity, and since the mold is cooled by suitable means (not shown) the material will solidify to form an envelope or sleeve around the wheel rim base or core A extending from one enlargement 47 to the other. When the material has become solidified by cooling, the pressure on the thermoplastic material is interrupted and the die plate 16 is moved away from the plate 17 so that the steering wheel with the molded section thereon may be removed from the dies and turned into another position to have another portion of the preformed rim A positioned in the mold cavity 26 in the same manner as heretofore described in connection with the first portion of the wheel. The process is then repeated until the three portions of the wheel rim shown in Figs. 1 to 5 are covered with the thermoplastic material.

If the enlargements or separating elements 47 on the wheel are to be made of a thermoplastic material, the depressions or recesses 49 in the ends of the enlargement may be omitted or replaced by corresponding outwardly extending portions and the enlargements 47 may be molded on the wheel in the same or similar machine provided with another set of dies shaped to form the enlargements 47. The covering portions 50 can then be progressively sectionally molded on the wheel rim in the same manner as described.

It is obvious that this process can be carried out for sectionally molding a relatively large article without a prefabricated part such as the rim core A, since articles corresponding to the parts 47 can be clamped in the mold at the ends of the die cavity, whereupon by molding, a part corresponding to the part 50 can be molded to the parts held in the mold.

In Figs. 6 to 8 inclusive, I have shown a wheel of modified construction made in accordance with my process. In this wheel, the mold cavity is so formed that the progressively formed sections of thermoplastic material 52 terminate at points approximately intermediate between the spokes. In forming these sections, the gripping portions 46 at the ends of the mold cavity are formed to engage the preformed wheel rim core A, and thus form the ends of the sections 52. These ends may, for example, be provided with annular parts or projections 53, as clearly shown in Fig. 7. The mold cavity may also be provided with a portion which forms the thermoplastic material at 54 around the outer ends of the spokes a. The molding of the three sections 52, is effected in a manner similar to that described in connection with the forming of the sections 50, except that these sections will not have their ends abutting against enlargements on the wheel rim. Instead the sections 52 will be spaced from each other. After the sections 52 have been progressively molded on the wheel, the spaces between the ends of the sections can be filled with inserts of any suitable or desired kind. For example, semi-circular inserts 55 and 56 may be provided which fit into the spaces between adjacent sections 52 and these semi-annular inserts may be made of metal and secured in place by means of a bolt or rivet 57 extending through the same and through a hole in the rim core A. The semi-annular insert may also be made of thermoplastic material which may be readily cemented in place by wetting the inner faces of the inserts and the ends of the sections 52 with acetone or other solvent for the thermoplastic material. In this manner, the inserts can be securely cemented in place to the ends of the sections 52 and to each other, and if desired, a bolt 57 may also be used, the head of which could, for example, be molded into one of the semi-annular inserts.

It is, of course, also possible to produce the article shown in Figs. 6 to 8 by first applying the parts 55 and 56 to the wheel rim core A and then molding the sections 52 to the rim, as described in connection with Figs. 1 to 5.

In Figs. 9 and 10, I have shown a modified form of this invention which is applicable either to a rim of a steering wheel or to a straight or bent rod which may be employed as a core to which the thermoplastic sections may be molded. In this case, sleeves or ferrules 60 are provided which may be used as enlargements or separating elements for the sections, to cooperate with the gripping parts 46 of the mold and which may form the ends of the mold cavity. These sleeves are preferably provided on their inner surfaces with a series of grooves or keyways 61 and 62 extending from the outer ends of the sleeve or ferrule 60 into proximity to the middle portion 63, which is formed for snug or tight engagement with a core 64, which may be the base or core of the rim of a steering wheel or a straight or otherwise shaped rod. It will be obvious that after these sleeves or ferrules are correctly and equally spaced on the core or base 64, the molding of the sections 65 of the thermoplastic material may be progressively effected in the same manner as heretofore described, the mold being so formed that the gripping portions 46 thereof cooperate with the sleeves or ferrules 60 to hold the core member 64 in correct relation to the mold cavity and to close the ends of the same. The hot thermoplastic material then flows under pressure into the grooves or keyways 61 and 62 of the sleeves, which securely anchors the ends of the sections 65.

When my progressive sectionally molding process is used for forming straight or only slightly curved parts, it will be obvious that the machine may be used as heretofore constructed with straight tie bars or rods in place of one or more arched tie members. An example article of this type is shown in Fig. 11, in which the article may be formed entirely of thermoplastic material. In this figure, an article of any desired cross sectional shape is progressively sectionally molded by molding each section to an end or edge of a preformed or previously molded section. For example, 70 represents a preformed article or section, which may be made of molded thermoplastic material. This article or section is clamped between the molds or dies 71 and 72 at an end of the mold cavity and thus closes one end of this cavity. When plasticized thermoplastic material is forced into the mold cavity and cooled, a section 74 is formed which may be suitably joined to the article or section 70. In order to accomplish this, the end of the article 70 which is clamped between the dies may be provided with a portion adapted to interlock with the adjacent end of the section 74, a tenoned end portion 75 being shown by way of example in Fig. 11. The other end of the die cavity may be formed to produce a similar end portion 76 on the section 74. Consequently, a long continuous article may be progressively sectionally molded by advancing the section 74, after removal of the same from the die cavity, into the position in which the article 70 is shown in Fig. 11. The section 74 then becomes the preformed article and the process may be repeated indefinitely to produce articles of any desired length. In this manner, rods, bars, plates, panels and many other articles can be made of any desired length or width.

It is obvious that the process described in connection with Fig. 11 can be carried on equally well if the thermoplastic material is molded to a preformed metal member which may extend through the mold cavity from end to end thereof.

If, for example, a relatively long rod, bar, plate, or panel is to be molded, a corresponding mold is placed into the machine and a pre-fabricated base to which the material is to be molded may, if desired, be used in connection with such mold and passed successively through the mold to progressively mold sections of thermoplastic material thereon. If the preformed article is provided with enlargements which may be engaged by the mold at the ends of the mold cavity, then the sections of molded material may be formed between these enlargements, as indicated in Figs. 1 to 5, 9 and 10. If the preformed article has no enlargements, the thermoplastic material may be molded on the preformed article by molding each section thereof to an edge or end of a preceding section, as shown in Fig. 11. As another alternative, the mold itself at the ends of the cavity therein may be formed with gripping portions engaging the preformed article as described in connection with Figs. 6 to 8 inclusive, so that gaps are formed between the molded sections, which may be closed in any suitable manner, for example, by means of inserts of similar material which may be cemented or otherwise secured to the article between sections of molded material. It is one of the advantages of my process that the inserts used in this manner may be of different color, shade or texture than the main sections of the article and this makes it possible to produce artistic and pleasing effects that cannot be produced by processes in which the entire molding is done in one operation. The variation in colors can also be produced by forming the enlargements 47 shown in Figs. 1 to 5 of thermoplastic material of a different color from that of the sections 50.

The process described has the advantage that it makes it possible to employ injection or extrusion molding for the purpose of producing articles including a much larger quantity of thermoplastic material than the normal capacity of the machine on which the articles are formed. Since the cost of machines of this kind increases very materially as the machines increase in size and capacity, it will be obvious that my improved process makes it possible to mold articles at a lower cost than heretofore possible, since they can be formed by the use of smaller and less expensive machines. Also since the dies required for progressive sectional molding are smaller than those required for molding large articles, it follows that the cost of producing such large articles in accordance with my process is further decreased. It is also well known that smaller molds will cool much faster than larger molds, and consequently, each molding operation on the small mold can be completed in a materially shorter time than an operation on a larger mold. In the use of my process on some types of articles, it is also more easily possible to accurately mold the thermoplastic material on a preformed article, since relatively small portions of the article are confined in a mold at one time, and such smaller portions can be more accurately positioned in a mold cavity than larger articles.

A further advantage of my method is that by sectionally molding the thermoplastic material above a metal core, the ends of the thermoplastic sections form expansion joints with adjacent sections. This is very desirable for the reason that thermoplastic materials generally have a much higher co-efficient of expansion than steel or other metals that might be used as cores. Consequently, when the finished article is subjected to low temperatures, the sections encasing the core may separate slightly from each other to take care of the difference in contraction between the thermoplastic material and the metal, whereas in articles in which the thermoplastic material is formed in one piece about a relatively long metal core, such for example as the rim of a steering wheel, cracks develop in the thermoplastic material when the article is subjected to low temperatures.

It sometimes happens that the material of the core tends to writhe or twist due to internal strains in the metal, and when this happens the joints between adjacent sections formed in accordance with my process provide for a slight rotary movement of the end of one section relatively to the adjacent end of an adjoining section, thus avoiding rupture of the thermoplastic material.

In addition to the use of my process in connection with wheels or other circular objects, straight articles such as rods, panels or the like, it will be obvious that frames or other looped articles may be progressively sectionally molded in accordance with my process.

I claim as my invention:

1. A method of molding a thermoplastic material to a preformed article having separating elements spaced at intervals thereon, which comprises molding a section of thermoplastic material to the article between a pair of separating elements, and overlapping at its ends with said elements to form a continuous surface along said article, then successively advancing the article into different positions and similarly molding other sections between other pairs of separating elements.

2. A method of molding a thermoplastic material to a preformed article, which comprises successively molding a plurality of similar spaced sections of thermoplastic material to the article, and disposing connecting and separating elements on said article in the space between the ends of adjacent sections, to form a continuous surface.

3. A method of progressively sectionally molding a thermoplastic material on a preformed part of a steering wheel, comprising placing a portion of a steering wheel into a cavity of a mold, gripping the steering wheel in said mold at the ends of said cavity, forcing a plasticized thermoplastic material under pressure into the cavity of said mold to form a section encasing a part of said wheel, solidifying the material in said cavity, releasing said steering wheel from said mold and placing another portion of said wheel spaced from said first mentioned portion into said cavity, repeating the process until the desired parts of the steering wheel are covered with spaced apart sections of said material, and applying other sections of encasing material on said wheel in and filling the spaces between said molded sections to provide a continuous encasement on said wheel.

4. A method of progressively sectionally molding a thermoplastic material on a rim of a steering wheel, comprising placing a portion of the rim of said steering wheel into a cavity of a mold with other portions of said rim clamped in said mold adjacent to said cavity, forcing plasticized thermoplastic material into said cavity and chilling said material therein, releasing said rim from said mold, and turning said wheel to place another portion of said rim spaced from said first-mentioned portion into said cavity, repeating the process until the desired parts of the rim are covered with spaced apart sections of said material, and applying other sections of encasing material on said wheel in and filling the spaces between and overrunning with said molded sections to provide a continuous encasement on said wheel.

5. A method of progressively sectionally molding a thermoplastic material on a preformed article between enlarged portions thereof, including placing a portion of said article between said enlargements into a cavity of a mold, clamping said enlarged parts of said article in said mold to hold said article in place therein and have said enlarged parts form the ends of said cavity, forcing a plasticized thermoplastic material under pressure into the cavity, solidifying said material in said cavity, releasing said article from clamping engagement with said mold, and advancing the article into a position in which another portion thereof extends into said cavity and in which other enlarged portions thereof are clamped in said molds to form ends of said cavity, and repeating the operations until successive portions of said article between said enlarged portions are coated.

6. A method of progressively sectionally molding a thermoplastic material on a rim of a steering wheel having enlarged portions arranged at spaced intervals thereon, comprising clamping a portion of the rim between two enlarged portions thereof in a mold with said enlarged portions forming the ends of the cavity of the mold, forcing plasticized thermoplastic material into said cavity under pressure and solidifying the same, releasing said wheel from clamping engagement with said mold and turning the wheel into a position in which another portion thereof between enlarged portions extends into said cavity, and repeating the process until all portions of said rim between enlarged portions are coated with said material.

7. An improved method of forming an object by injection molding of a relatively large quantity of thermoplastic material to a core with an injection molding machine too small to mold all of said thermoplastic material on said core in a single injection molding operation, which method comprises molding sections of said material one at a time on said core, with adjacent ends of molded sections telescoping to some extent with one another to form a continuous surface along said core.

8. An improved method of injection molding of a relatively large quantity of thermoplastic material to a core by an injection molding machine too small to mold all of said thermoplastic material on the core in a single injection molding operation, which method comprises molding said material on said core in separate spaced sections in different successive molding operations, and applying interponent members to the remainder of said core which abut closely with said molded sections and form therewith a continuous covering for said core.

9. An improved method of forming an article of the type having a base and a continuous surface covering on the base, and which covering contains more thermoplastic material than can be molded by a single injection molding operation of the molding machine employed, which method comprises forming spaced sections of said covering on said base, and molding other sections of said covering directly on said base by injection molding the same between said spaced sections of said covering in a cavity formed between separable molding dies, with said first mentioned, spaced sections of the covering forming end walls for the cavity of the molding dies in the injection molding of said other sections.

10. An improved method of forming an article of the type having a base and a continuous surface covering on the base which covering comprises sections which abut end to end and which covering contains more thermoplastic material than can be molded by a single injection molding operation of the molding machine employed, which method comprises injection molding one of said sections directly on said base, and advancing the base after the injection molding of said section to place a different portion of the base in position for molding another section thereon, and injection molding said other section on said base.

11. An improved method of forming an article of the type having a base and a continuous surface covering on the base and which covering contains more thermoplastic material than can be molded by a single injection molding operation of the molding machine employed, which method comprises injection molding selected sections of said covering successively one at a time directly on said base and in tandem abutting engagement with and in separable non-welded relationship to other sections to form a continuous jointed surface covering on said base, advancing the base after each injection molding of a section thereon to place another portion of the base in position to have a section injection molded thereon, and injection molding a section on said other portion.

12. An improved method of forming an article of the type having a base and a continuous surface covering on the base, and which covering contains more thermoplastic material than can be molded by a single injection molding operation of the machine employed, which method comprises forming spaced apart sections of said covering in succession on said base by injection molding, and interposing other covering sections between the molded sections with end portions telescoping with the adjacent end portion of the molded sections to form a continuous covering for the base.

13. An improved method of injection molding of a relatively large object by an injection molding machine too small to mold said object by a single injection molding operation, and which object is of the type having a continuous, closed loop, reinforcing core therethrough and a continuous encasement for said core, said encasement being formed in sections which abut end to end to form a continuous encasement for said core, at least alternate sections of said encasement being formed by injection molding of thermoplastic material on said core, which method comprises injection molding a section on said core, turning said closed loop core after said section has been molded to place another portion of said core in position for injection molding of a section thereon and injection molding a section on said other portion.

14. An improved method of injection molding of a relatively large object by an injection molding machine too small to mold said object by a single injection molding operation, and which object is of the type having a continuous, closed loop, reinforcing core therethrough and a continuous encasement for said core, which method comprises forming selected spaced apart sections of said encasement one at a time on said core by injection molding, and disposing other sections between the molded sections with rotatable connections between adjacent sections, to form a continuous encasement on said core with relatively rotatable connections between adjacent sections of said encasement, to reduce the torque on the core through twisting of the encasement of said object.

15. An improved method of applying a thermoplastic coating material to a relatively large object by an injection molding machine too small to apply all of the desired coating material to said object by a single injection molding operation, and which object is of the type having a continuous core with enlargements thereon at spaced intervals, which method comprises molding encasing sections on said core one at a time between adjacent successive enlargements by injection molding in a mold cavity, while using said enlargements to form the ends of the mold cavity, whereby said enlargements will form continuations joining the molded encasement sections on said core.

16. An improved method of molding thermoplastic material to produce an article including more thermoplastic material than can be molded by a single injection molding operation of the molding machine employed, which method includes clamping a part of an article of thermoplastic material to which a section of said material is to be applied, in a mold having a cavity, and with said part of an article forming an end wall of said cavity, forcing thermoplastic material into said mold cavity for molding said material against said portion of said article extending into said cavity, then advancing the article relatively to said mold into another position to close said end of said cavity and form an end thereof, and again molding thermoplastic material to the portion of the article forming an end of said cavity.

17. An improved method of forming an article of the type having a base and a continuous surface covering on the base and which covering contains more thermoplastic material than can be molded by a single injection molding operation of the molding machine employed, which method comprises molding one section of said covering by injection molding directly to the base and then applying another section to the base in tandem and telescopic relation to the first applied section.

JOHN B. TEGARTY.